US009142152B2

(12) United States Patent
Tankleff et al.

(10) Patent No.: US 9,142,152 B2
(45) Date of Patent: Sep. 22, 2015

(54) DISPLAY DIAGNOSTICS USING TWO-DIMENSIONAL BARCODES

(71) Applicant: Hewlett-Packard Development Company, L.P., Fort Collins, CO (US)

(72) Inventors: Bruce Aaron Tankleff, The Woodlands, TX (US); Bruce R. Watson, Houston, TX (US); Kyle D. Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 199 days.

(21) Appl. No.: 13/723,530

(22) Filed: Dec. 21, 2012

(65) Prior Publication Data

US 2014/0175163 A1 Jun. 26, 2014

(51) Int. Cl.
*G06K 7/10* (2006.01)
*G09G 3/00* (2006.01)

(52) U.S. Cl.
CPC .................................... *G09G 3/006* (2013.01)

(58) Field of Classification Search
USPC .............. 235/462.09, 462.25, 462.46, 462.15
See application file for complete search history.

(56) References Cited

U.S. PATENT DOCUMENTS

| | | | | |
|---|---|---|---|---|
| 7,474,115 | B1 | 1/2009 | Trujillo et al. | |
| 7,938,330 | B2 * | 5/2011 | Kiuchi et al. | 235/454 |
| 8,078,307 | B2 | 12/2011 | Ohashi | |
| 8,542,867 | B2 * | 9/2013 | Sato et al. | 382/100 |
| 2007/0119940 | A1 * | 5/2007 | Futamura et al. | 235/462.11 |
| 2010/0116888 | A1 * | 5/2010 | Asami | 235/454 |
| 2012/0026315 | A1 | 2/2012 | Lee et al. | |
| 2012/0273563 | A1 * | 11/2012 | Shimamoto et al. | 235/375 |

OTHER PUBLICATIONS

Li, W-C. et al., Defect Inspection in Low-contrast LCD Images Using Hough Transform-based Nonstationary Line Detection, (Research Paper), IEEE Transactions on Industrial Infomatics, Feb. 2011, pp. 136-147; vol. 7, No. 1.

Tsai, D-M. et al., Low-contrast Surface Inspection of Mura Defects in Liquid Crystal Displays Using Optical Flow-based Motion Analysis, Journal of Machine Vision and Applications, Jul. 2011, vol. 22, Issue 4, http://dl.acm.org/citation.cfm?id=2003405 2003406, pp. 629-649.

* cited by examiner

*Primary Examiner* — Ahshik Kim
(74) *Attorney, Agent, or Firm* — Hewlett-Packard Patent Department

(57) ABSTRACT

Techniques for performing diagnostics on an electronic display are described in various implementations. In one example implementation, a method may include receiving image data that depicts a test protocol being displayed on an electronic display, the test protocol comprising a two-dimensional barcode. The method may also include processing the image data to determine whether a message encoded in the two-dimensional barcode is corrupted. The method may also include generating a diagnostic result for the electronic display based on the determination.

20 Claims, 3 Drawing Sheets

DISPLAY DIAGNOSTICS USING TWO-DIMENSIONAL BARCODES

BACKGROUND

Barcodes are machine-readable, optical representations of encoded information. In typical applications, barcodes may be printed on, attached to, or otherwise associated with physical or virtual objects, and the encoded information may generally correspond to the associated objects. For example, a barcode printed on product packaging may contain a Universal Product Code (UPC) and/or other information associated with the product.

Traditional barcodes, which are still in use today, are often referred to as linear or one-dimensional barcodes. In one-dimensional barcodes, the encoded information is represented using a series of parallel lines of varying widths and spacing. Over time, barcodes have evolved to now also include matrix or two-dimensional barcodes, where the encoded information is represented using a variety of symbols such as rectangles, dots, hexagons, and other geometric patterns. In general, two-dimensional barcodes are able to represent more information per unit area than one-dimensional barcodes.

One specific type of two-dimensional barcode is the now ubiquitous Quick Response code (QR code) that was developed in the 1990s. OR codes utilize a pattern of three distinctive squares near three respective corners of the barcode, and a smaller fourth square near the fourth corner to normalize the image (e.g., for orientation, size, and viewing angle). The amount of data that can be stored in a QR code depends on the complexity and size of the QR code (expressed as the version of the QR code), as well as the error correction level of the QR code. As an example, a version 40, error correction level L QR code can encode over 4,000 characters of alphanumeric data (which is over 2.5 times the amount of text in these first three paragraphs).

DETAILED DESCRIPTION

Electronic displays exist in many shapes and sizes, and are used for a wide variety of applications. The display quality of such electronic displays is often tested or at least spot-checked during manufacturing to ensure that the displays are capable of producing an image quality that is acceptable for the particular type of display. However, after the display leaves the factory, a combination of any number of factors (e.g., the number of hours operated, exposure to the elements, physical damage or vibrations, and the like) may cause the image quality to degrade.

A number of different front-of-screen diagnostics methodologies may be used to test the image quality of a display after it has left the factory, many of which involve removing the display from its normal operating environment and subjecting the display to a battery of tests using complex and expensive video capture and processing technologies. However, such testing may be cost-prohibitive given the level of testing that is required for a particular implementation. Furthermore, it may be difficult or inconvenient to remove the display from its environment to perform the testing.

In cases where such off-site testing is impractical, or for other reasons, front-of-screen diagnostics may be performed manually by a human user who may interact with the display in its normal environment. These types of manual diagnostics typically involve displaying instructions to the user (e.g., explaining what the user should look for on a given test screen), displaying the test screen to the user, and asking the user to provide his or her observations, such as by manually indicating whether the display net the requirements of a particular test. However, such manual diagnostics are, by their very nature, based on qualitative and subjective observations of the user, and are therefore subject to human error. Furthermore, manual diagnostics procedures can be fairly time-consuming to perform properly.

Described herein are techniques for performing automated front-of-screen testing using two-dimensional barcodes (e.g., QR codes or other appropriate two-dimensional barcodes) that are displayed on the electronic display to be tested. The two-dimensional barcodes displayed on the electronic display to be tested may be captured and analyzed using basic computing devices, such as smartphones, tablets, or other appropriate devices having an associated image capture mechanism. Such techniques may provide relatively fast, inexpensive, and accurate front-of-screen diagnostics that may be performed in a variety of different environments, including the normal operating environments of many electronic displays, regardless of their implementation.

Figure 1:
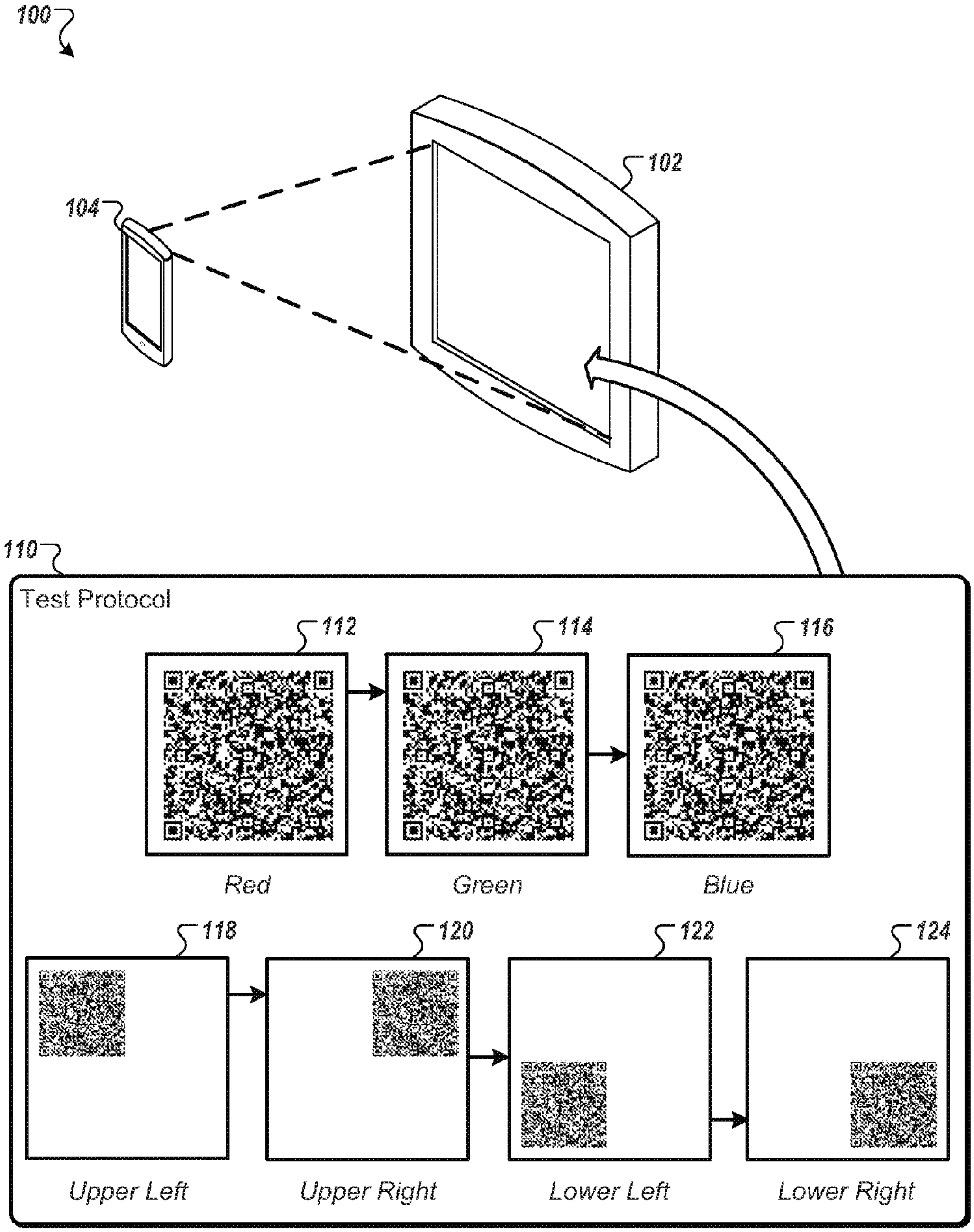
FIG. 1 is a conceptual diagram of an example display diagnostic environment in accordance with implementations described herein.

FIG. 1 is a conceptual diagram of an example display diagnostic environment 100 in accordance with implementations described herein. As shown, the example display diagnostic environment 100 includes an electronic display 102 and a computing device 104, such as a mobile computing device, that is positioned to capture information displayed on the screen of the electronic display 102. In some implementations, the electronic display 102 may be controlled by a separate display control device (not shown) that provides signals for display on the electronic display 102. In other implementations, the electronic display 102 may include integrated display control functionality such that a separate display control device is not required.

The electronic display 102 may be implemented as a standalone unit, or may be implemented as a user interface component of an integrated system. For example, the electronic display 102 may be implemented as part of a point of sale (POS) system, or as part of another appropriate system. In some implementations, the electronic display 102 may be generally inaccessible, except for viewing purposes, to users of the display. For example, the electronic display 102 may be housed in a sealed system where only the front of the screen is visible or otherwise accessible to users of the system. Examples of such systems may include, e.g., the screen of an automated teller machine (ATM) or of a self-checkout system at a grocery store. In such systems, it may be especially difficult or expensive to move the system, or to remove the electronic display 102 in order to perform off-site display diagnostics.

The example topology of environment 100 may be representative of various display environments. However, it should be understood that the example topology of environment 100 is shown for illustrative purposes only, and that various modifications may be made to the configuration. For example, environment 100 may include different or additional components, or the components may be implemented in a different manner than is shown. Additionally, while device 104 is illustrated as a smartphone, it should be understood that device 104 may, in practice, be any appropriate type of computing device, including for example a tablet, a laptop computer, or the like.

In operation, the electronic display 102 may be configured to display test screens that include one or more two-dimensional barcodes rendered in a manner that allows for testing of a particular desired (or undesired) characteristic associated with the electronic display 102. For example, the two-dimensional barcodes may be rendered and displayed monochromatically and with intentionally low contrast on test screens intended to determine whether a particular hue (e.g., red, green, blue, or any other appropriate color) is being displayed properly. As another example, the two-dimensional barcodes may be rendered and displayed in different regions of the electronic display 102 on test screens that are intended to determine the sharpness and/or other characteristics of the display in a particular region of the display.

The computing device 104 may be positioned to capture the test screens as they are displayed on the screen of the electronic display 102. For example, in the case of a smartphone, a user may hold the smartphone at an appropriate distance from the electronic display 102 such that a portion of or the entirety of the screen is visible to the camera of the smartphone. As the images containing the test screens are captured, the computing device 104 may process the captured images to determine whether the two-dimensional barcodes are being displayed properly by the electronic display 102. For example, the computing device 104 may determine whether the two-dimensional barcode in the processed image is interpretable, and if so, whether the message encoded in the two-dimensional barcode matches a predetermined, expected message. If so, then the device 104 may determine that the two-dimensional barcode is being displayed properly by the electronic display 102, and may generate a "passing" diagnostic result associated with the particular characteristic being tested by the test screen. If not, then the device 104 may generate a "failing" diagnostic result associated with the particular characteristic being tested by the test screen.

The image processing that is performed by the computing device 104 may be dependent on the type of test screen being displayed and the particular characteristic of the display being tested by the test screen. For example, in the case of a test screen intended to test whether a particular color is being displayed properly, the computing device 104 may digitally enhance the captured image by filtering the captured image for a selected hue. The computing device 104 may also or alternatively apply other appropriate processing to the captured images.

One or more test screens and/or types of test screens may be included in a series of tests to form a test protocol 110. As shown, test protocol 110 includes a series of seven test screens, but it should be understood that different test protocols may be used. The test protocols used in accordance with the techniques described here may be configurable and may be implementation-specific to test for various characteristics that are considered to be relevant for a given implementation.

The example test protocol 110 includes seven test screens 112, 114, 116, 118, 120, 122, and 124. Test screens 112, 114, and 116 are configured to test whether the primary colors of red, green, and blue are being displayed properly by the electronic display 102. Test screen 112 shows a nearly full-screen rendering of a single QR code that is displayed monochromatically (using different tints, tones, and/or shades of red) and with low contrast. Test screen 114 shows a nearly full-screen rendering of a single QR code that is displayed monochromatically (using different tints, tones, and/or shades of green) and with low contrast. Test screen 116 shows a nearly full-screen rendering of a single QR code that is displayed monochromatically (using different tints, tones, and/or shades of blue) and with low contrast.

It should be understood that other appropriate monochromatic barcodes may additionally or alternatively be used in various implementations. In addition, the sizing of such barcodes may be modified as appropriate. In some implementations, the monochromatic barcodes may be configured to contain a common encoded message. In other implementations, the barcodes may be configured to contain different encoded messages. For example, a color-specific indicator may be included in the message to identify the color that is being tested on a particular test screen.

Test screens 118, 120, 122, and 124 are configured to test whether different regions of the electronic display 102 are functioning properly. Test screen 118 shows a rendering of a single OR code that is displayed in a first region (e.g., the upper left quadrant) of the electronic display 102. Test screen 120 shows a rendering of a single OR code that is displayed in a second region (e.g., the upper right quadrant) of the electronic display 102. Test screen 122 shows a rendering of a single OR code that is displayed in a third region (e.g., the lower left quadrant) of the electronic display 102. Test screen 124 shows a rendering of a single OR code that is displayed in a fourth region (e.g., the lower right quadrant) of the electronic display 102.

It should be understood that other appropriate regional barcode placements may additionally or alternatively be used in various implementations. For example, in widescreen display implementations, six OR codes may be displayed on the test screens rather than four (e.g., to account for the rectangular shape of the electronic display). In some cases, the various OR codes may be displayed to overlap distinct regions as appropriate. In some implementations, the screen may be divided into a greater number of regions (e.g., sixteen regions for a square-shaped screen or twenty-four regions for a rectangle-shaped screen), with a separate two-dimensional barcode being displayed in each region, to increase the resolution of the regional diagnostics. In addition, in some implementations, the various regional OR codes may be displayed simultaneously with one or more of the other regional OR codes, provided that interference from adjacent or nearby QR codes can be avoided.

In some implementations, the barcodes displayed in the various regions may contain a common encoded message. In other implementations, the barcodes displayed in the various regions may contain different encoded messages. For example, a region-specific indicator may be included in the message to identify the particular region that is being tested by a particular displayed barcode.

In some implementations, the color testing protocols associated with test screens 112, 114, and/or 116 may be combined with the regional testing protocols associated with test screens 118, 120, 122, and/or 124. For example, the regional barcodes may be rendered monochromatically and with low contrast, such that the colors being displayed in a particular region of the screen may be tested.

Figure 2:
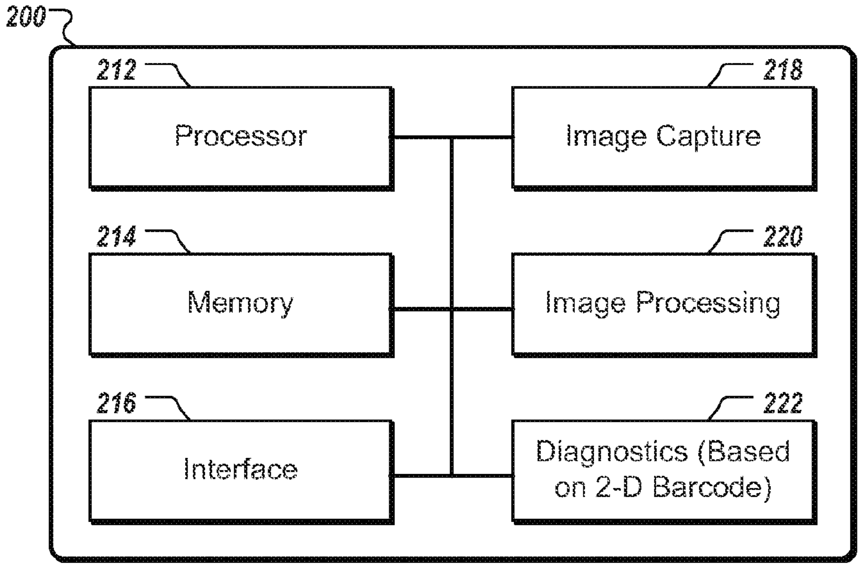
FIG. 2 is a block diagram of an example computing system for performing diagnostics on an electronic display in accordance with implementations described herein.

FIG. 2 is a block diagram of an example computing system 200 for performing diagnostics on an electronic display in accordance with implementations described herein. Computing system 200 may, in some implementations, be used to perform portions or all of the functionality described above with respect to the computing device 104 of FIG. 1. However, it should be understood that the computing system 200 may include any appropriate type of computing device, including for example smartphones, tablets, desktops, laptops, workstations, servers, or the like. In the case of a computing system 200 that does not have an integrated display, camera, and/or other functional components as described with respect to computing device 104, an external display, camera, and/or other functional components may be communicatively coupled to the computing system 200.

As shown, the example computing system 200 may include a processor 212, a memory 214, an interface 216, an image capture device 218, an image processing module 220, and a diagnostics module 222. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

Processor 212 may be configured to process instructions for execution by the computing system 200. The instructions may be stored on a non-transitory tangible computer-readable storage medium, such as in memory 214 or on a separate storage device (not shown), or on any other type of volatile or non-volatile memory that stores instructions to cause a programmable processor to perform the techniques described herein. Alternatively or additionally, computing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 216 may be implemented in hardware and/or software, and may be configured, for example, to receive and respond to inputs provided by a user. The inputs may be provided to interface 216, e.g., via a user interface of the computing system. Example user interfaces of the computing system may include touchscreen devices, pointing devices, keyboards, voice input interfaces, visual input interfaces, or the like. Responses may also be provided by interface 216, e.g., via display on a display device, including touchscreen devices, or via other user interface mechanisms, including audio or haptic feedback, for example.

In some implementations, interface 216 may be configured to facilitate the initiation of a test protocol on the electronic display without physically connecting to the electronic display or to a computing device driving the electronic display. Such indirect initiation of a testing protocol may be useful in cases where the electronic display and/or the computing device that drives the electronic display are housed in a sealed enclosure that does not permit easy access (e.g., a self-checkout POS system in a grocery store). To initiate the test protocol on the electronic display, the system may generate a test-initiation barcode that causes the electronic display to enter a diagnostics mode, and the test-initiation barcode may be displayed via interface 216. In turn, the test-initiation barcode may be read by a barcode reader associated with the electronic display. For example, a user may scan the test-initiation barcode being displayed via interface 216, which may initiate the test protocol on the electronic display of the POS system.

Image capture device 218 may be configured to capture video images (i.e. a series of sequential video frames) at any desired frame rate, or to take still images, or both. The image capture device 218 may be a still camera, a video camera, or other appropriate type of device that is capable of capturing images. The image capture device 218 may be configured to trigger image capture on a continuous, periodic, or on-demand basis. The image capture device 218 may capture a view of the entire field of view, or a portion of the field of view (e.g. a physical region, black/white vs. color, etc.) as appropriate. As used here, an image is understood to include a snapshot, a frame or series of frames (e.g., one or more video frames), a video stream, or other appropriate type of image or set of images. In operation, the image capture device 218 may capture an image of an electronic display to be tested, and more specifically to capture an image of the screen of the electronic display.

Image processing module 220 may execute on processor 212, and may be configured to process any captured images using appropriate image processing techniques. For example, image processing module 220 may apply image enhancement techniques, filtering techniques, or other appropriate image processing techniques to focus the diagnostics to be performed on the two-dimensional barcode in the captured images. The image processing module may also be configured to identify the two-dimensional barcode (or barcodes) present in the captured images.

Diagnostics module 222 may execute on processor 212, and may be configured to determine whether the two-dimensional barcode in the captured images is legible, and if so, whether the message encoded in the two-dimensional barcode matches an expected test message. To determine if the two-dimensional barcode is legible, diagnostics module 222 may attempt to interpret the message encoded in the two-dimensional barcode using appropriate barcode decoding techniques. If the message cannot be decoded from the two-dimensional barcode, then the two-dimensional barcode may be considered illegible or otherwise uninterpretable. If the message can be decoded, then it is compared to the expected test message, with a match indicating that the two-dimensional barcode is being rendered and displayed properly by the electronic display.

The expected test message may be stored in a location accessible by the diagnostics module 222, e.g., in memory 214. The expected test message may be arbitrary and/or configurable for a particular diagnostic or implementation, but is generally configured to match the message that is included in a proper rendering of the two-dimensional barcode. As such, if the display properly renders and displays the two-dimensional barcode included on a particular test screen, the message encoded in the two-dimensional barcode will match the stored, expected test message.

If the two-dimensional barcode is legible and the message encoded in the two-dimensional barcode matches the expected test message, then the diagnostics module 222 may generate a positive diagnostic result for that particular test screen. If the two-dimensional barcode is illegible or if the message encoded in the two-dimensional barcode does not match the expected test message, then the diagnostics module 222 may generate a negative diagnostic result for that particular test screen.

Figure 3:
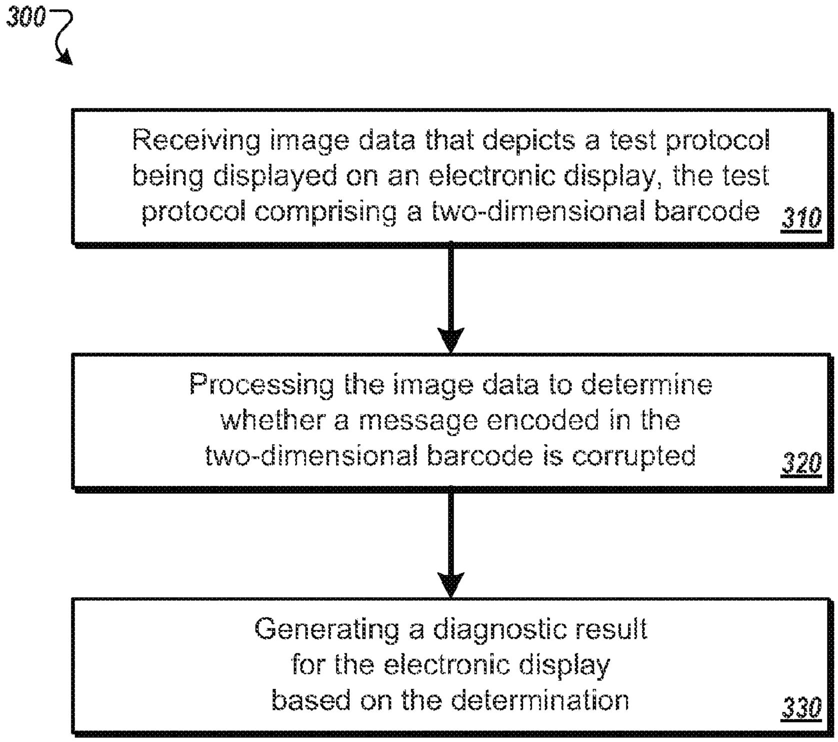
FIGS. 3 and 4 are flow diagrams of example processes for performing diagnostics on an electronic display in accordance with implementations described herein.

FIG. 3 is a flow diagram of an example process 300 for performing diagnostics on an electronic display in accordance with implementations described herein. The process 300 may be performed, for example, by a mobile device such as the computing device 104 illustrated in FIG. 1, or by computing system 200 illustrated in FIG. 2. For clarity of presentation, the description that follows uses the computing system 200 as the basis of an example for describing the process. However, it should be understood that another system, or combination of systems, may be used to perform the process or various portions of the process.

Process 300 begins at block 310 when a computing system receives, e.g., from an image capture device, image data that depicts a test protocol being displayed on an electronic display. The test protocol may include any appropriate number of test screens, each of which may include one or more two-dimensional barcodes.

The test protocol may be configured in a number of different ways. For example, in some implementations, the test protocol may include displaying a single two-dimensional barcode monochromatically and with low contrast. As another example, the test protocol may include displaying a series of two-dimensional barcodes monochromatically and with low contrast, with each of the test screens in the series displaying the two-dimensional barcodes in a different color. In some implementations, the test protocol may include displaying a number of two-dimensional barcodes on different regions of the electronic display, either on a series of test screens or on a single test screen.

In some implementations, the test protocol may include displaying a number of two-dimensional barcodes in a number of stages intended to test different aspects of the electronic display. For example, the test protocol may be configured to display three two-dimensional barcodes displayed serially in three stages, where each two-dimensional barcode is displayed monochromatically in a different primary color and with low contrast. Such a test protocol may test the electronic display's ability to properly display the three primary colors, and if so, may be indicative of a display that will be able to display all colors properly. Alternatively, or in addition, the test protocol may be configured to display a series of test screens where two-dimensional barcodes are displayed on different regions of the electronic display. Such a test protocol may test the electronic display's ability to properly render and display images on specific regions of the display, and if all of the regions "pass", then it may be indicative of a display that will be able to display properly across the entirety of the screen.

At block 320, the computing system processes the image data to determine whether a message encoded in the two-dimensional barcode is corrupted. For example, the message may be determined to be corrupted if the two-dimensional barcode cannot be interpreted by the computing system, or if the message does not match an expected message.

In some cases, such as in the case of a test screen intended to test for proper display of a particular color, the computing system may process the image data by filtering the image for the particular color being tested. In such cases, the image processing may ensure that the color being displayed by the electronic display is within a certain range, and may also enhance the contrast of the image such that the two-dimensional barcode may be properly decoded. In other cases, different or additional image processing may be applied to the captured image data.

At block 320, the computing system generates a diagnostic result for the electronic display based on the determination. For example, if the message encoded in the two-dimensional barcode is determined to match an expected test message, then the system may generate a "passing" diagnostic result. Otherwise, if the message encoded in the two-dimensional barcode is determined to be corrupted, then the system may generate a "failure" diagnostic result.

Figure 4:
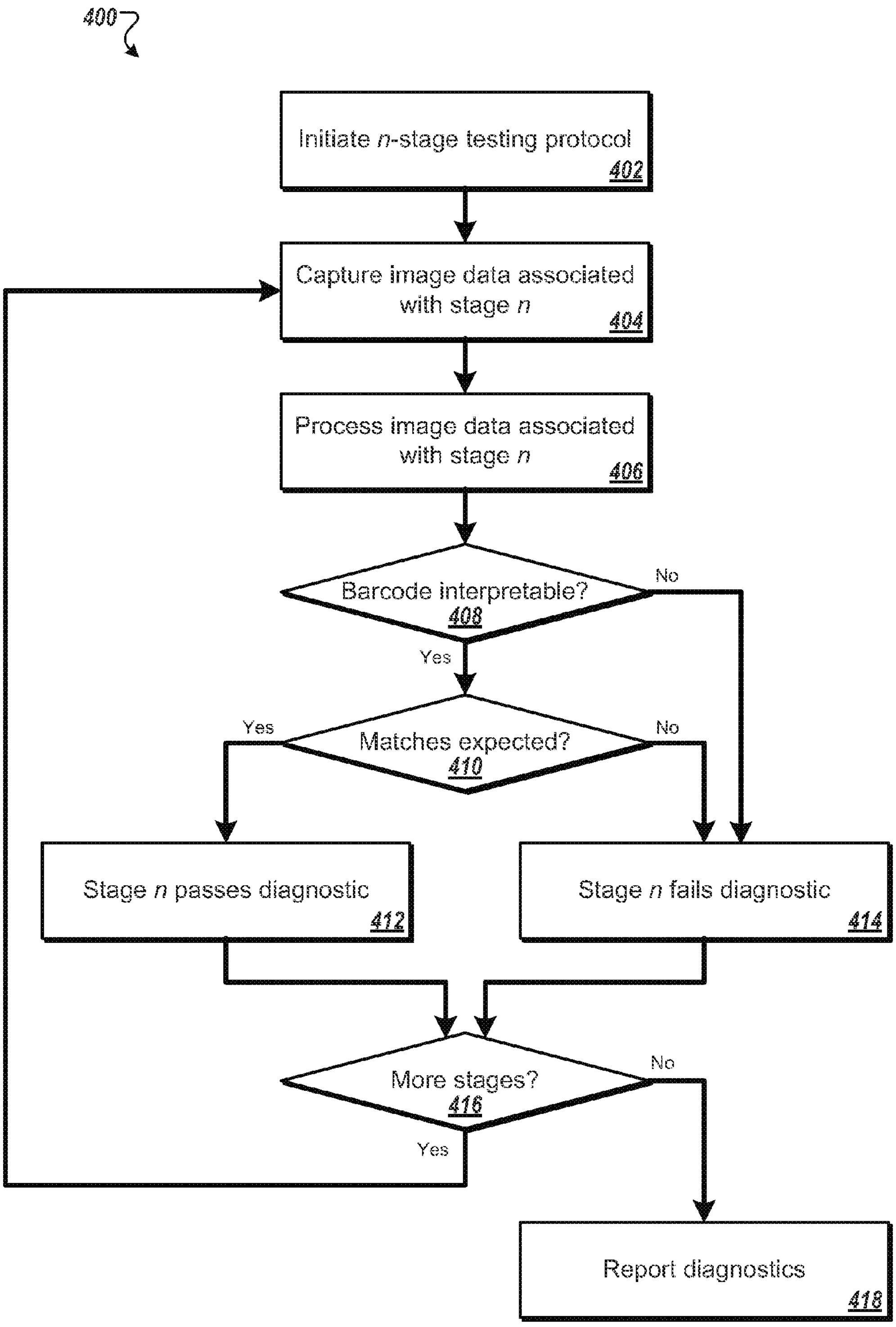

FIG. 4 is a flow diagram of another example process 400 for performing diagnostics on an electronic display in accordance with implementations described herein. The process 400 may be performed, for example, by a mobile device such as the computing device 104 illustrated in FIG. 1, or by computing system 200 illustrated in FIG. 2. For clarity of presentation, the description that follows uses the computing system 200 as the basis of an example for describing the process. However, it should be understood that another system, or combination of systems, may be used to perform the process or various portions of the process.

Process 400 begins at block 402 when an n-stage testing protocol is initiated. For example, the testing protocol may be initiated via an exposed user interface associated with the electronic display. The testing protocol may be a single stage (e.g., using a single test screen), or may incorporate any appropriate number of stages.

At block 404, image data associated with stage n is captured, e.g., by the image capture device 218 of computing system 200. The image data may include a single two-dimensional barcode being displayed on the electronic display, or multiple two-dimensional barcodes being displayed on the electronic display.

At block 406, the image data associated with stage n is processed, e.g., by the image processing module 220 of computing system 200. The image processing that is applied to a particular image may depend upon the type of diagnostic being performed.

At block 408, the computing system 200 determines if the two-dimensional barcode in the processed image is interpretable. If the two-dimensional barcode in the processed image is interpretable, then the computing system 200 determines if the message encoded in the two-dimensional barcode matches the expected test message at block 410. If so, then stage n of the diagnostic passes at block 412.

If the two-dimensional barcode in the processed image is not interpretable (based on the determination at block 408), or if the message encoded in the two-dimensional barcode fans to match the expected test message (based on the determination at block 410), then stage n of the diagnostic fails at block 414.

Following the results of stage n, the computing system 200 determines if any more stages of the testing protocol remain at block 416. If so, then blocks 404 through 416 are repeated until all stages are completed. At block 418, after all stages are completed, the compiled diagnostics may be reported.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method for performing diagnostics on an electronic display, the method comprising:

receiving, at a computer system and from an image capture device, image data that depicts a test protocol being displayed on an electronic display, the test protocol comprising a two-dimensional barcode;

processing the image data, using the computer system, to determine whether a message encoded in the two-dimensional barcode is corrupted; and generating, using the computer system, a diagnostic result for the electronic display based on the determination.

2. The method of claim 1, wherein the message is determined to be corrupted when the two-dimensional barcode cannot be interpreted by the computer system.

3. The method of claim 1, wherein the message is determined to be corrupted when the message does not match an expected message.

4. The method of claim 1, wherein the two-dimensional barcode is displayed monochromatically and with low contrast, and wherein processing the image data comprises filtering the image data for a selected hue.

5. The method of claim 1, wherein the test protocol includes a plurality of two-dimensional barcodes displayed on different regions of the electronic display, and wherein processing the image data comprises determining whether a respective message encoded in each of the respective plurality of two-dimensional barcodes is corrupted.

6. The method of claim 1, wherein the test protocol includes a plurality of two-dimensional barcodes that are displayed on the electronic display in a plurality of stages that test different aspects of the electronic display.

7. The method of claim 6, wherein the test protocol includes three two-dimensional barcodes displayed serially in three stages, each two-dimensional barcode being displayed monochromatically in a different primary color and with low contrast.

8. The method of claim 1, further comprising initiating the test protocol by communicating with the electronic display without physically connecting to the electronic display or to a computing device driving the electronic display.

9. The method of claim 8, wherein initiating the test protocol comprises generating a test-initiation barcode, and displaying the test-initiation barcode to a barcode reader associated with the electronic display.

10. The method of claim 1, wherein the computer system comprises a mobile computing device and the image capture device is integrated with the mobile computing device.

11. A mobile computing device comprising:

one or more processors;

an image capture device that captures an image of an electronic display to be tested;

an image processing module, executing on at least one of the one or more processors, that processes the image and identifies a two-dimensional barcode being displayed on the electronic display; and a diagnostics module, executing on at least one of the one or more processors, that determines whether the two-dimensional barcode is legible, and if so, whether a message encoded in the two-dimensional barcode matches an expected test message.

12. The mobile computing device of claim 11, wherein the diagnostics module generates a positive diagnostic result if the two-dimensional barcode is legible and the message encoded in the two-dimensional barcode matches the expected test message, and generates a negative diagnostic result if the two-dimensional barcode is illegible or if the message encoded in the two-dimensional barcode does not match the expected test message.

13. The mobile computing device of claim 11, wherein the two-dimensional barcode is displayed monochromatically and with low contrast, and wherein the image processing module processes the image by filtering the image for a selected hue.

14. The mobile computing device of claim 11, wherein the image capture device captures a plurality of images of the electronic display, wherein the plurality of images include a corresponding plurality of two-dimensional barcodes respectively displayed on different regions of the electronic display, and wherein the diagnostics module determines whether each of the plurality of two-dimensional barcodes is legible, and if so, whether a regional message encoded in each of the plurality of two-dimensional barcodes matches an expected regional test message corresponding to a particular region of the electronic display on which the two-dimensional barcode is displayed.

15. The mobile computing device of claim 14, wherein the regional test message includes an indicator associated with the particular region of the electronic display on which the two-dimensional barcode is displayed.

16. The mobile computing device of claim 11, wherein the image capture device captures a series of images of an electronic display to be tested corresponding to a series of two-dimensional barcodes that are displayed monochromatically in a different color and with low contrast on the electronic display, and wherein the image processing module processes the series of images by filtering the series of images for different respective hues.

17. A non-transitory computer-readable storage medium storing instructions that, when executed by one or more processors, cause the one or more processors to:

receive an image of an electronic display to be tested;

process the image to identify a two-dimensional barcode being displayed on the electronic display;

determine whether the two-dimensional barcode is interpretable, and if so, whether a message encoded in the two-dimensional barcode matches an expected test message; and generate a diagnostic result based on the determination, the diagnostic result indicating whether the electronic display to be tested is functioning properly based on the determination of whether the two-dimensional barcode is interpretable, and if so, whether a message encoded in the two-dimensional barcode matches an expected test message.

18. The non-transitory computer-readable storage medium of claim 17, wherein the two-dimensional barcode is displayed monochromatically and with low contrast, and wherein processing the image comprises filtering the image for a selected hue.

19. The non-transitory computer-readable storage medium of claim 17, further comprising instructions that cause the one or more processors to receive a plurality of images of the electronic display, wherein the plurality of images include a corresponding plurality of two-dimensional barcodes respectively displayed on different regions of the electronic display, and further comprising instructions that cause the one or more processors to determine whether each of the plurality of two-dimensional barcodes is interpretable, and if so, whether a regional message encoded in each of the plurality of two-dimensional barcodes matches an expected regional test message corresponding to a particular region of the electronic display on which the two-dimensional barcode is displayed.

20. The non-transitory computer-readable storage medium of claim 19, wherein the regional test message includes an indicator associated with the particular region of the electronic display on which the two-dimensional barcode is displayed.

* * * * *